United States Patent [19]

Payne et al.

[11] Patent Number: 4,607,892

[45] Date of Patent: Aug. 26, 1986

[54] TRACKED VEHICLE ROAD WHEEL

[75] Inventors: Roger E. Payne, Okemos; James B. Weeks, Eaton Rapids, both of Mich.

[73] Assignee: Motor Wheel Corporation, Lansing, Mich.

[21] Appl. No.: 600,791

[22] Filed: Apr. 12, 1984

[51] Int. Cl.⁴ ............................................. B62D 55/12
[52] U.S. Cl. .................................. 305/56; 361/63 DS; 361/63 PW
[58] Field of Search ..................... 305/24, 28, 56, 57; 301/63 PD, 63 DS

[56]  References Cited
U.S. PATENT DOCUMENTS

| | | |
|---|---|---|
| 566,750 | 9/1896 | Gardner . |
| 1,750,278 | 3/1930 | Moyer . |
| 1,870,801 | 8/1932 | Engstrom . |
| 2,184,545 | 12/1939 | Collier . |
| 2,198,831 | 4/1940 | Moyer . |
| 2,720,119 | 10/1955 | Sherman . |
| 2,978,073 | 4/1961 | Soddy . |
| 2,984,524 | 5/1961 | Franzen ............... 305/24 X |
| 3,007,745 | 11/1961 | Even ...................... 305/56 |
| 3,113,647 | 12/1963 | Tuttle . |
| 3,374,005 | 3/1968 | Donlon et al. . |
| 3,576,352 | 4/1971 | Sato ................... 305/35 EB |
| 3,603,650 | 9/1971 | Miller .................... 305/56 |
| 3,606,497 | 9/1971 | Gilles .................... 305/56 |
| 3,774,465 | 11/1973 | Brasseur . |
| 3,774,979 | 11/1973 | Harris ..................... 305/24 |
| 3,788,155 | 1/1974 | Cigala et al. . |
| 3,790,230 | 2/1974 | Jespersen . |
| 3,996,810 | 12/1976 | Groff ...................... 305/25 |
| 3,997,217 | 12/1976 | Bandet et al. ............ 301/5 R |
| 4,083,247 | 4/1978 | Umezaki et al. . |
| 4,203,633 | 5/1980 | Hare . |
| 4,349,234 | 9/1982 | Hartmann ................ 305/56 |
| 4,350,196 | 9/1982 | Hampshire ........... 301/63 PW |
| 4,538,860 | 9/1985 | Edwards et al. .......... 305/56 |

FOREIGN PATENT DOCUMENTS

| | | |
|---|---|---|
| 737756 | 7/1943 | Fed. Rep. of Germany . |
| 1939240 | 2/1971 | Fed. Rep. of Germany ........ 305/56 |
| 1939239 | 9/1977 | Fed. Rep. of Germany . |
| 47745 | 6/1937 | France . |

OTHER PUBLICATIONS

Frados, J., *Plastics Engineering Handbook;* Reinhold, 4th Ed.: N.Y. 1976, pp. 62–63 and 462–469.

Primary Examiner—David A. Scherbel
Attorney, Agent, or Firm—Barnes, Kisselle, Raisch, Choate, Whittemore & Hulbert

[57] ABSTRACT

A road wheel for track-laying vehicles having a wear surface exposed to abrasive contact with the track guide lugs, which wear surface is formed by a wear-resistant material embedded in and surrounded by a matrix which forms an integral part of the wheel structure. The wear-resistant material may comprise a lubricant such as fibers, particles and/or bands of graphite, molybdenum disulfide, nylon, Teflon or other self-lubricating plastics which reduce friction between the wheel and track. Alternatively or conjointly, the wear-resistant material may comprise fibers, particles and/or bands of steel, tungsten carbide or ceramic. Where the wheel is of molded construction, such as aluminum or fiber-reinforced resin, the wear-resistant material may be molded into position adjacent to and the wear surface at the time of wheel manufacture. Where the wheel is preformed, the wear-resistant material may be bonded in a separately-formed resin matrix which is then permanently affixed to the road wheel shoulder.

11 Claims, 14 Drawing Figures

FIG. 1
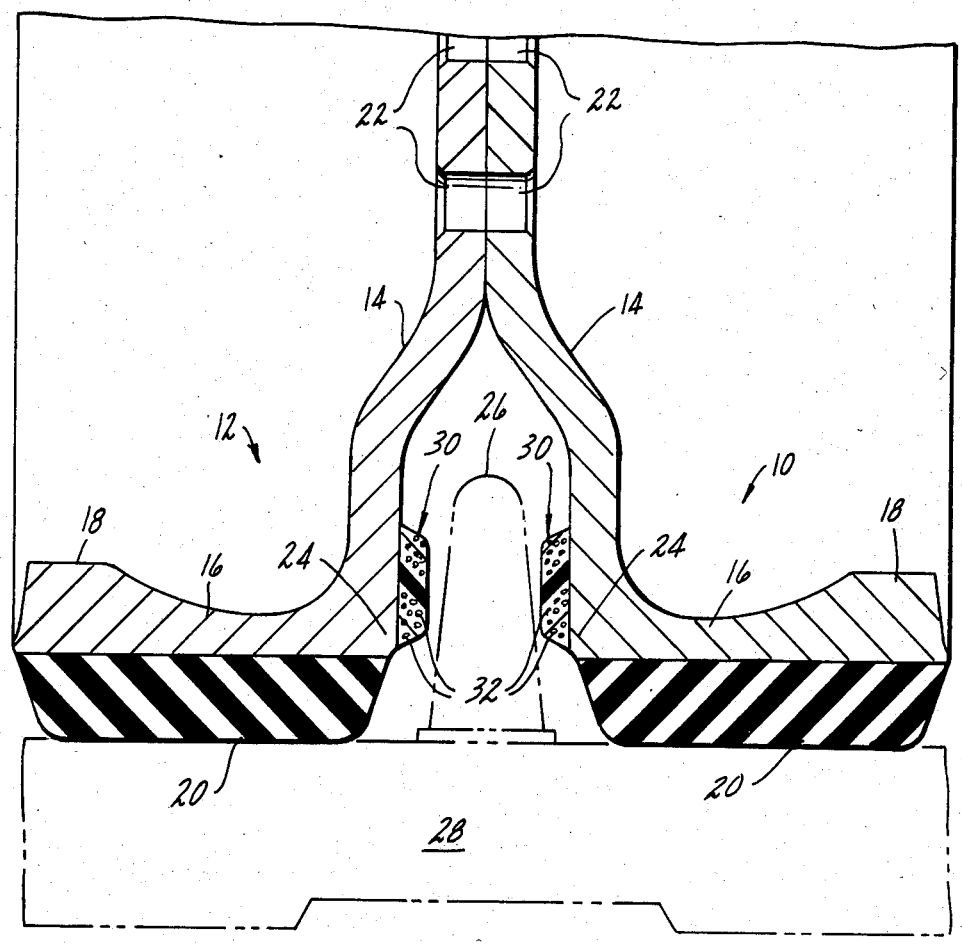
FIG. 2
FIG. 3
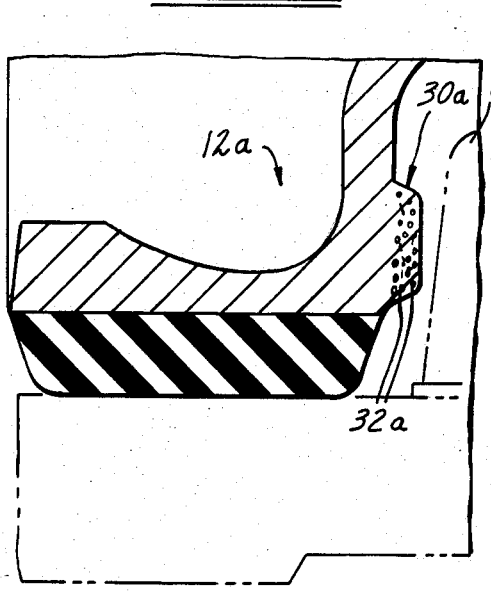

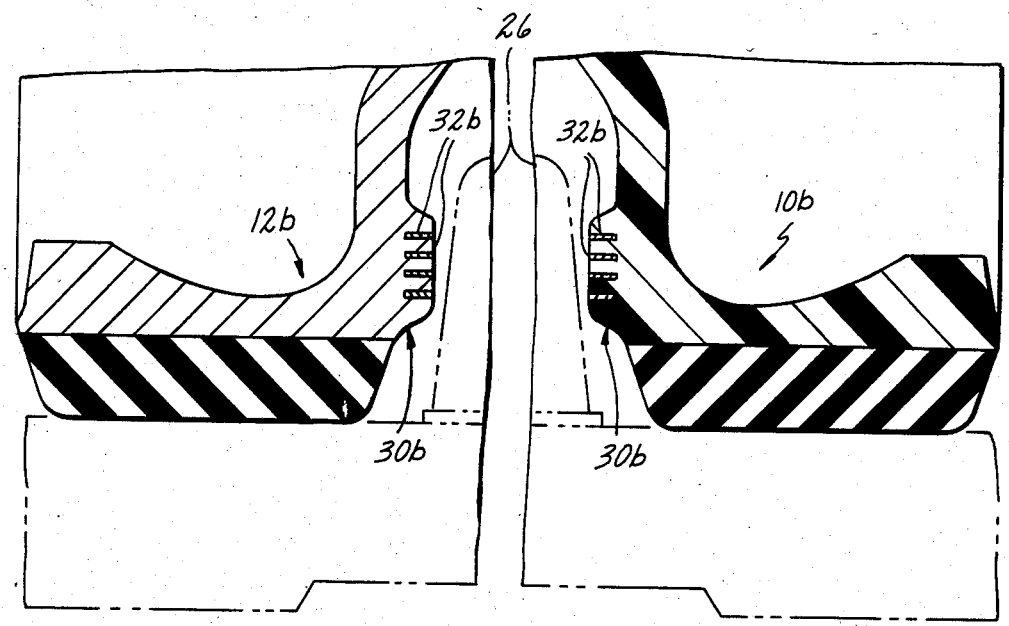

TRACKED VEHICLE ROAD WHEEL

The present invention is directed to disc wheels, and more particularly to road wheels for track-laying vehicles.

Conventional road wheels for track-laying vehicles include a circular disc, an annular rim projecting axially from the disc, and a rubber tire affixed externally of the rim. The wheels are typically mounted in opposed pairs, with space being provided between the wheel rims for receiving the guiding lugs of the endless track. Separate bands of hardened steel are typically bolted, riveted or otherwise affixed to the opposing shoulders of the wheels to resist wear by the guide lugs. Such mounting techniques are expensive to implement; and the wear bands are prone to separation from the wheel during long-term use.

A general object of the present invention is to provide a road wheel of the aforementioned type which is economical to manufacture and reliable over an extended operating lifetime.

More specifically, it is an object of the invention to provide a more economical and efficient technique for forming wear-resistant surfaces on the road wheel shoulders.

A further object of the invention is to provide such a technique which finds particular application in lightweight road wheels of aluminum or resin construction.

In accordance with the present invention, road wheels for track-laying vehicles are provided with a wear surface in the form of wear resistant material carried in a mold-formed matrix which forms an integral part of the wheel structure. The wear resistant material may comprise a lubricant, such as fibers, particles or bands of graphite, molybdenum disulfide, nylon, Teflon (trademark) or other self-lubricating plastics, which reduce friction between the wheel and track, and/or may comprise fibers, particles or bands of steel, tungsten carbide or ceramic. Where the wheel is of mold-formed construction, such as aluminum or fiber-reinforced resin, the wear resistant material may be molded or cast in position adjacent to and at the wear surface. Where the wheel is preformed, the wear resistant material may be bonded in a separately-formed resin matrix which is then permanently affixed to the road wheel shoulder.

The invention, together with additional objects, features and advantages thereof, will be best understood from the following description, the appended claims and the accompanying drawings in which:

FIG. 1 is a fragmentary sectional view in a diametric plane which bisects one embodiment of the tracked vehicle road wheel in accordance with the invention;

FIGS. 2–5 are fragmentary sectional views similar to that of FIG. 1 illustrating respective modified embodiments of the invention;

FIGS. 6 and 7 are fragmentary perspective views of respective embodiments of the wear bands illustrated in FIGS. 4 and 5;

Figures 8, 9:
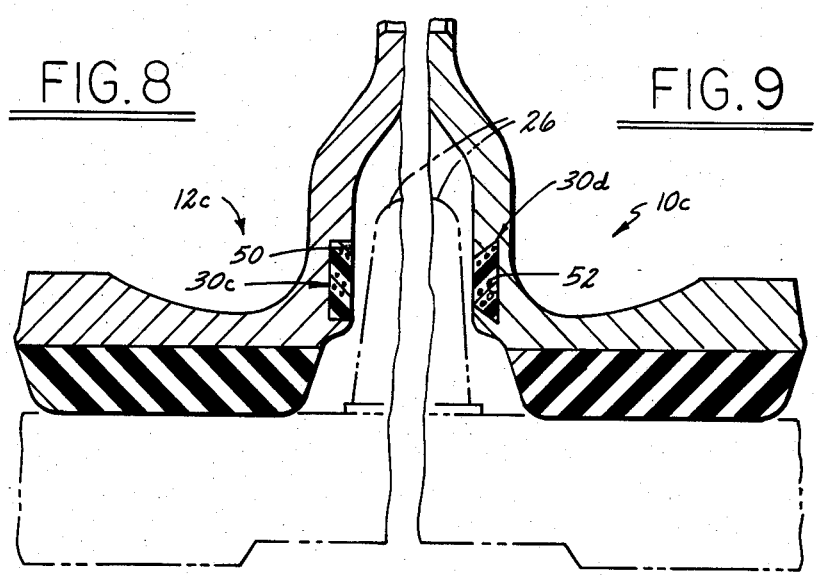
FIGS. 8–11 are fragmentary sectional views similar to that of FIG. 1 illustrating further modified embodiments of the invention.

FIG. 1 illustrates a pair of tracked vehicle road wheels 10,12, each of which includes a central disc 14 with an integral annular rim 16 projecting axially as a flange from the periphery thereof. The edge 18 of each rim 16 remote from its associated disc 14 is usually thickened or otherwise reinforced for added strength. A solid rubber tire 20 is generally molded onto or otherwise permanently secured to the radially outwardly facing surface of each rim 16. The disc, rim and/or rim-strengthening flange may also be formed as separate elements, where appropriate, and joined into an integral subassembly.

Wheels 10,12 are conventionally mounted in opposed pairs as shown in FIG. 1, with each disc 14 being provided with suitable openings 22 for mounting the wheels to an associated vehicle wheel hub (not shown). The axially opposed shoulders 24 of each wheel 10,12 at the juncture of each disc 14 and rim 16 are spaced from each other so as to permit passage therebetween of the guide lugs of the associated endless track, one such guide lug 26 and associated track cleat 28 being shown in phantom in the drawings. It is conventional practice to provide wear resistant structure on the opposing shoulders 24 to resist abrasion due to passage of the lugs 26 therebetween. It is toward such wear resistant structure on the road wheels that the present invention is directed.

More specifically, the embodiment of the invention illustrated in FIG. 1 comprises an annular band 30 permanently secured to each of the axially opposed wheel shoulders 24. Each band 30 includes a resin matrix having wear resistant material 32 embedded therein. Bands 30 may be separately formed in a suitable mold of epoxy or polyester resin composition, for example, and permanently secured after curing to the wheel shoulders. Alternatively, bands 30 may be molded directly onto the wheel shoulders. Wear resistant material 32 may be in the form of fibers extending circumferentially of bands 30 and shoulders 24, or may comprise particles suspended in the resin matrix. Such fibers or particles may comprise a lubricant such as graphite, molybdenum disulfide, nylon, Teflon (trademark) or other self-lubricating plastics which reduce friction between the wheels and the track lugs 26. Alternatively, such fibers or particles may be of hardened wear resistant construction such as cables or shot, or other particulate of steel, tungsten carbide, ceramic or other suitable composition.

The embodiment of FIG. 1 is particularly useful where the wheel discs and rims are preformed in one or more casting, forging or forming operations of types conventionally employed in the art. The embodiments of FIGS. 2 and 3, on the other hand, find particular utility where the wear resistant material may be embedded in the structure of a mold-formed wheel at the time of manufacture. More specifically, wheel 12a of FIG. 2, which may be of cast or forged aluminum construction, for example, has the band 30a formed integrally therewith by reason of casting or forging the wheel material around the wear resistant material 32a so that the latter is contained within the wheel structure. The wheel 10a of FIG. 3 is of molded fiber-reinforced resin construction, and likewise has the wear resistant band 30a molded integrally therewithin. In each case, the wear resistant material 32a is placed in a suitable mold before addition thereto of the fluid metal or the resin mold charge, so that during the molding operation the wear resistant material is embedded in the wheels 10a, 12a adjacent to and at the wheel shoulders and becomes an integral part thereof.

FIG. 4 illustrates a cast or forged metal wheel 12b wherein the wear resistant material 32b consists of steel ribbon stock hardened for optimum wear resistance, spirally coiled on edge and molded into the wheel structure so as to place one edge of the multiple spiral piles at the exposed surface of the shoulder band 30b. Likewise, in FIG. 5, wear resistant material 32b, consisting of spirally coiled ribbon stock, is molded into the fiber-reinforced resin wheel 10b at the time of manufacture so as to place one edge of the spiral coils at the wheel shoulder wear surface. Two embodiments of the spirally coiled wear band material 32b are illustrated in FIGS. 6 and 7. In FIG. 6, circumferentially spaced dimples 40 are formed in the ribbon stock 42 prior to coiling thereof so as to space successive spiral coil plies from each other. In FIG. 7, the channels or indentations 44 are preformed in the coil stock 42 for the same purpose. The coil stock may be chemically or mechanically roughened to enhance adhesion to the surrounding material. In forming of the wheels 10b, 12b (FIGS. 5 and 4), the space between successive plies is thus filled with the material of the wheel itself, aluminum in FIG. 4 and fiber-reinforced resin in FIG. 5, so that such wheel material forms a matrix which surrounds the wear coils. Rather than steel, ribbon material 32b may comprise other wear-resistant materials such as tungsten carbide or ceramic or a low-friction material such as nylon or graphite.

FIGS. 8 and 9 illustrate modifications wherein the wear bands 30c and 30d are disposed in respective annular recesses 50,52 formed in the shoulders of wheels 12c, 10c. In FIG. 8, the recess 50 is generally rectangular in cross section, and band 30c may be formed separately or molded into recess 50. In FIG. 9, recess 52 is trapezoidal in cross section, and band 30d is molded therein. Note that in both FIGS. 8 and 9 (as well as in FIGS. 10–11), the wear surfaces of bands 30c, 30d are flush with the adjacent wheel disc surfaces rather than axially offset therefrom as in FIGS. 1–5.

Figures 10, 11:
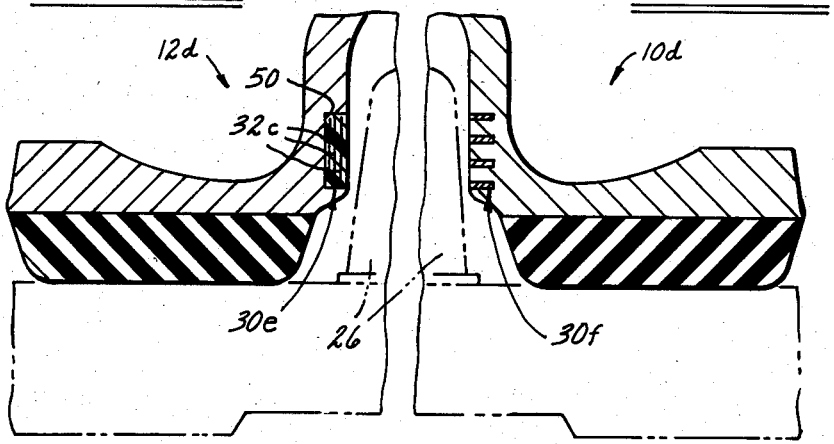

FIG. 10 illustrates yet another modified embodiment 12d wherein the wear band 30e comprises a plurality of radially oriented fibers 32c in a resin matrix. Such radially oriented fibers 32c have the advantage of being parallel to the orientation of guide lugs 26. It is also contemplated, and within the scope of the present invention, to combine radially oriented fibers per FIG. 10 with circumferentially oriented fibers and/or particles per FIGS. 1–3 and 8–9. Another modification contemplates randomly oriented fibers, with or without particles, thus combining the advantages of both radially and circumferentially oriented fibers. The embodiments 10d of FIG. 11 is similar to that of FIG. 5 except that the wear surface of the band 30f is flush with the adjacent disc surface, as in FIGS. 8–10.

Figure 12:
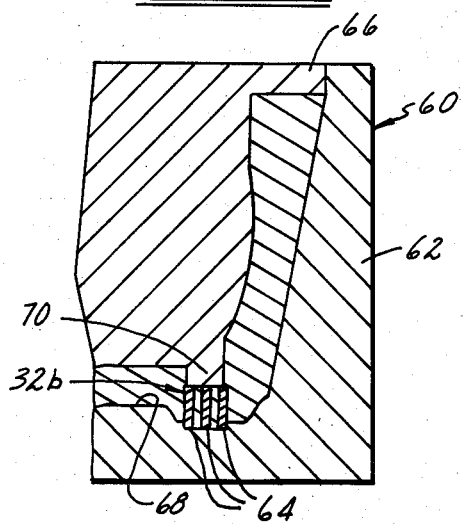
FIG. 12 is a fragmentary sectional view of a mold for manufacturing the embodiment of FIG. 12.

FIG. 12 is a semi-schematic illustration of a mold 60 for manufacturing the wheel 12b of FIG. 4. Band material 32b is first coiled as previously described, and then placed on a lower die section 62 in suitably formed locating grooves 64. An upper die section 66 cooperates with lower die section 62 to form a wheel mold cavity 68, and has a circumferential series of depending pins 70 for holding band 32b in grooves 64. The usual sprue opening is provided for receiving molten metal to the wheel body. Following removal from mold 60, band material 32b may be machined flush with the surrounding matrix surface. A similar mold and technique may be employed in manufacturing the embodiments of FIGS. 5 and 11.

Figure 13A:
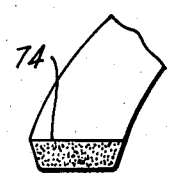
FIGS. 13A and 13B are fragmentary sectional views which illustrate manufacture of the embodiment of FIG. 2.

FIGS. 13a and b illustrate a technique for manufacture of the wheel 12c of FIG. 2. A preform 74 is first formed as a compacted ring which includes a base metal powder having wear particles homogenously mixed throughout. Preformed ring 74 is then placed in an annular channel 76 of the lower die segment 78 of a mold 80. The upper die segment 82 is then placed over lower die segment 78, and the base metal 84 is cast or forged onto preform 74. The heat of such base metal fuses the metal powder of preform 74 to form an integral part of the wheel with the wear particles suspended therein at the wheel shoulder. As an alternative (not illustrated), preform 74 may be sintered separately and adhered to the shoulder of a preformed wheel.

Figure 13B:
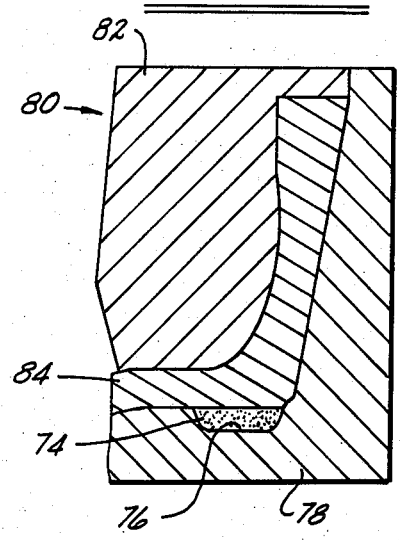

The wheel 10a of FIG. 3 may be made by cutting a preform from resin sheet molding compound having suitable particles and/or fibers suspended therein. The preform may be cut as a circular blank or as a linear strip which is then coiled flatwise. The preform may then be placed in a mold similar to that of FIG. 13B, and a fiber-reinforced resin wheel molded therearound. Alternatively, the preform may be molded separately and adhered to the shoulder of a preformed wheel, as in the embodiments 10, 12 of FIG. 1.

An important feature of the present invention lies in the fact that the wear resistant material is suspended in and extends axially throughout the matrix of the wear bands 30–30f. Thus, the wheel shoulder wear surfaces are self-replenishing in the sense that any wear to or abrasion of the surfaces by the track lugs 26 merely exposes fresh matrix and wear-resistant materials to the lugs. Thus, a surface which consists of wear-resistant material surrounded by matrix material is continuously presented for wear contact with the track lugs.

The invention claimed is:

1. A road wheel for track-laying vehicles which comprises a circular disc and an annular rim integrally axially projecting from the periphery of said disc forming a shoulder at the juncture of said rim and disc, said rim and disc being of one-piece mold-formed construction of composition selected from the group consisting of aluminum and fiber-reinforced resin, and an annular band of wear-resistant material integrally embedded in said mold-formed construction forming a self-replenishing axially facing wear surface at said shoulder, said band comprising a length of wear-resistant ribbon stock coiled on edge and molded into said shoulder with one edge at said surface and with the width of said ribbon stock extending into said shoulder.

2. The wheel set forth in claim 1 wherein said band comprises a length of wear-resistant ribbon stock coiled on edge to form multiple radially spaced spiral plies having a continuous edge disposed at said surface and having space between said plies filled with the material of said shoulder.

3. A road wheel for track-laying vehicles which includes a circular disc and an annular rim integrally and axially projecting from the periphery of said disc forming a shoulder at the juncture of said rim and disc, and means forming a generally axially facing wear surface and comprising an annular band of resin construction permanently secured to said shoulder and having embedded therein wear-resistant material selected from the group consisting of circumferentially oriented fibers, radially oriented fibers and discrete particles.

4. The road wheel set forth in claim 3 wherein said wear-resistant material comprises discrete particles of solid lubricant composition.

5. The road wheel set forth in claim 4 wherein said particles are selected from the group consisting of graphite, molybdenum disulfide, nylon and Teflon.

6. The road wheel set forth in claim 3 wherein said wear-resistant material comprises discrete particles of hardened wear-resistant composition.

7. The road wheel set forth in claim 6 wherein said particles are selected from the group consisting of steel, tungsten, carbide and ceramic.

8. A road wheel for track-laying vehicles which comprises a circular disc and an annular rim integrally axially projecting from the periphery of said disc forming a shoulder at the juncture of said rim and disc, said rim and disc being of one-piece mold-formed construction of composition selected from the group consisting of aluminum and fiber-reinforced resin, and wear-resistant material integrally embedded in said mold-formed construction forming a self-replenishing axially facing wear surface at said shoulder, said wear-resistant material comprising fibers oriented circumferentially of said disc around said shoulder.

9. A road wheel for track-laying vehicles which comprises a circular disc and an annular rim integrally axially projecting from the periphery of said disc forming a shoulder at the juncture of said rim and disc, said rim and disc being of one-piece mold-formed construction of composition selected from the group consisting of aluminum and fiber-reinforced resin, and wear-resistant material integrally embedded in said mold-formed construction forming a self-replenishing axially facing wear surface at said shoulder, said wear-resistant material comprising fiber oriented radially of said disc around said shoulder.

10. A road wheel for track-laying vehicles which comprises a circular disc and an annular rim integrally axially projecting from the periphery of said disc forming a shoulder at the juncture of said rim and disc, said rim and disc being of one-piece mold-formed construction of composition selected from the group consisting of aluminum and fiber-reinforced resin, and wear-resistant material comprising discrete particles integrally embedded in said mold-formed construction forming a self-replenishing axially facing wear surface at said shoulder.

11. A road wheel for track-laying vehicles which comprises a circular disc and an annular rim integrally axially projecting from the periphery of said disc forming a shoulder at the juncture of said rim and disc, said rim and disc being of one-piece mold-formed construction of composition selected from the group consisting of aluminum and fiber-reinforced resin, and wear-resistant material comprising a solid lubricant integrally embedded in said mold-formed construction forming a self-replenishing axially facing wear surface at said shoulder.

* * * * *